United States Patent [19]

D'Amico

[11] Patent Number: 5,226,233
[45] Date of Patent: Jul. 13, 1993

[54] METHOD FOR INSERTING A TIP SEAL IN A SCROLL TIP GROOVE

[75] Inventor: John J. D'Amico, Troy, Mich.

[73] Assignee: General Motors Corporation, Detroit, Mich.

[21] Appl. No.: 828,843

[22] Filed: Jan. 31, 1992

[51] Int. Cl.⁵ .............................................. B23P 15/00
[52] U.S. Cl. .......................... 29/888.022; 29/888.02; 29/450
[58] Field of Search ................. 29/888.022, 888.02, 29/450; 418/55, 56

[56] References Cited

U.S. PATENT DOCUMENTS

| | | | |
|---|---|---|---|
| 4,395,205 | 7/1983 | McCullough | 418/55 |
| 4,462,771 | 7/1984 | Teegarden | 29/888.022 |
| 4,561,832 | 12/1985 | Shimizu | 418/55 |
| 4,722,676 | 2/1988 | Sugimoto | 418/55 |
| 4,730,375 | 3/1988 | Nakamura et al. | 29/888.022 |

Primary Examiner—Irene Cuda
Attorney, Agent, or Firm—Ronald L. Phillips; Patrick M. Griffin

[57] ABSTRACT

Tip seal material 22 is provided on a tip seal reel 12 mounted on a reel support spindle 14. Tip seal material 22 is unwound from the reel 12 by a driven roller 26 of a tip seal material drive and metering mechanism 16. A tool tip assembly 18 with a passage 62 guides tip seal material into a scroll tip seal groove 52 of a scroll 24 inserted in a rotatable scroll assembly fixture nest 78. As the driven roller 26 feeds tip seal material 22 into the tip seal groove 52, the tip seal material rotates the scroll and moves the tool tip assembly 18 along shaft 54, which mounts in support members 56. A knife assembly 64 severs the tip seal material 22 when the proper length of tip seal material has been advanced by the driven roller 26. The driven roller 26 resumes feeding the tip seal material 22 after the severing operation. The resumed feeding results in the remaining severed piece of tip seal material being pushed and transferred from the passage 62 and into the scroll tip seal groove 52.

2 Claims, 3 Drawing Sheets

METHOD FOR INSERTING A TIP SEAL IN A SCROLL TIP GROOVE

TECHNICAL FIELD

The invention relates to a method and apparatus for inserting a seal in a groove in the axial tip of an involute spiral wrap for sealing scrolls used in scroll type fluid displacement apparatus.

BACKGROUND OF THE INVENTION

Scroll type fluid displacement apparatus incudes a pair of scrolls with end plates and involute spiral wraps having flank surfaces and axial tips. The flanks of the wrap on one scroll contact the flanks of the wrap on the other scroll and the axial tips carry seals which contact the end plate of the adjacent scroll to form sealed fluid pockets. Orbital movement of the pair of scrolls relative to each other will move the sealed pockets toward the center of the scrolls to compress or pump fluid.

Sealing between the axial tips of the wraps and the end plates is required to obtain high efficiency in scroll type fluid displacement machines. Axial tip sealing is complicated by axial expansion of the wraps due to temperature changes. When the scrolls are used in compressors, the temperature at the center of the scrolls is higher than the temperature at the outer edge of the scrolls. These temperature variations result in uneven axial expansion of the scroll wraps. The axial tip seals have to accommodate the uneven expansion of scroll wraps. Pumps and fluid expanders may also be subjected to uneven expansion of scroll wraps due to temperature changes in fluids during expansion or pumping.

Seals for the axial tips of scrolls are commonly die cut from flat sheets of seal material. This cutting procedure results in the loss of a substantial portion of the seal material as scrap. The scrap material is expensive due to high cost components used to make the seal material. There are also disposal costs associated with the scrap seal material.

Involute spiral seals are inserted in axial tip seal grooves by hand. The delicate spiral seals have to be inserted manually. Assembly machines could damage the delicate seal material.

A continuous strip of tip seal material can be formed into an involute spiral and cut to length. Seals formed by such a procedure are delicate. They can easily loose the involute shape and may even revert to a coil similar to their previous rolled shape.

SUMMARY OF THE INVENTION

The object of the invention is to form an axial tip seal from rolled strip of tip seal material.

Another object is to provide a machine which inserts tip seal material into axial tip seal grooves.

A further object of the invention is to form an axial tip seal from a rolled tip seal material strip and insert the tip seal material in an axial tip seal groove at the same time.

A reel of tip seal material is mounted on a spindle. A pair of drive rollers pull the tip seal material from the reel. The tip seal material passes through a series of guide rollers as it is pulled from the reel. The guide rollers straighten the tip seal material and guide it to the drive rollers.

A flexible tube guides the tip seal material from the drive rollers to a tool tip. A passage in the tool tip guides the tip seal material to an axial tip seal groove in the axial tip of a scroll wrap. A cam surface on the tool tip forces the tip seal material down into the axial tip seal groove. Continued feeding of tip seal material rotates the scroll inserted in a free spinning scroll assembly fixture nest, moves the tool tip and keeps the tip seal material in alignment with the axial tip seal groove.

The tip seal material is metered as it is pulled from the reel by the drive rollers. When the proper length of material has passed a cutter, the cutter is activated and the tip seal material is severed. Continued feeding of tip seal material by the drive rollers forces the remainder of the tip seal material into the axial tip seal groove, while moving the tool tip and keeping the tip seal material in alignment with the axial tip seal groove.

The drive rollers stop when one axial tip seal is fully inserted in the axial tip seal groove. The scroll, with an axial tip seal inserted, is removed from the scroll assembly fixture nest, a scroll without an axial tip seal is mounted on the scroll assembly fixture nest and the tool tip is moved back to the starting point. The cycle can then be repeated.

The foregoing and other objects, features and advantages of the present invention will become apparent in the light of the following detailed description of exemplary embodiments thereof, as illustrated in the accompanying drawing.

DETAILED DESCRIPTION OF THE INVENTION

Figure 1:
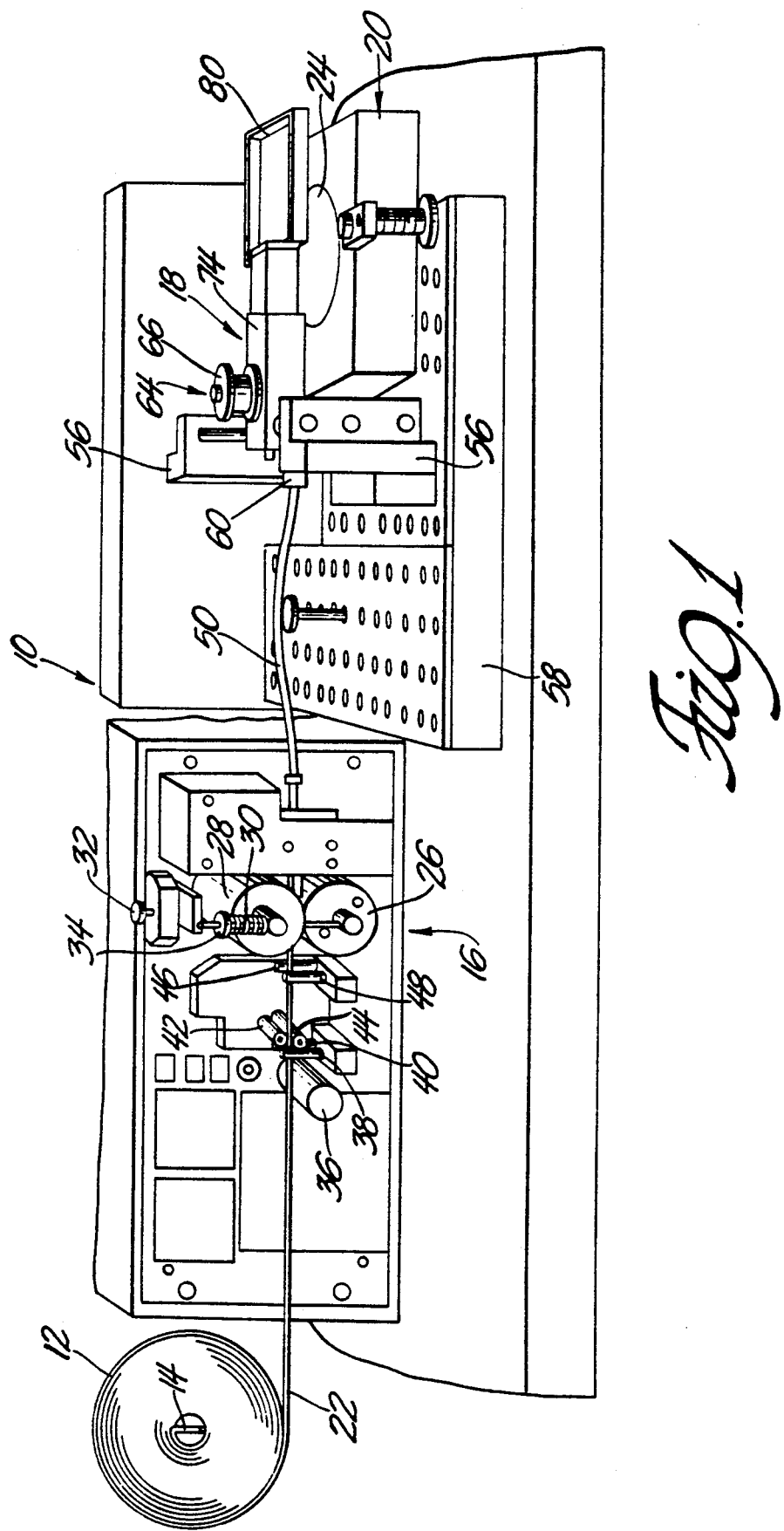
FIG. 1 is a perspective view of an automatic machine for inserting a tip seal in a scroll tip seal groove.
Figure 2:
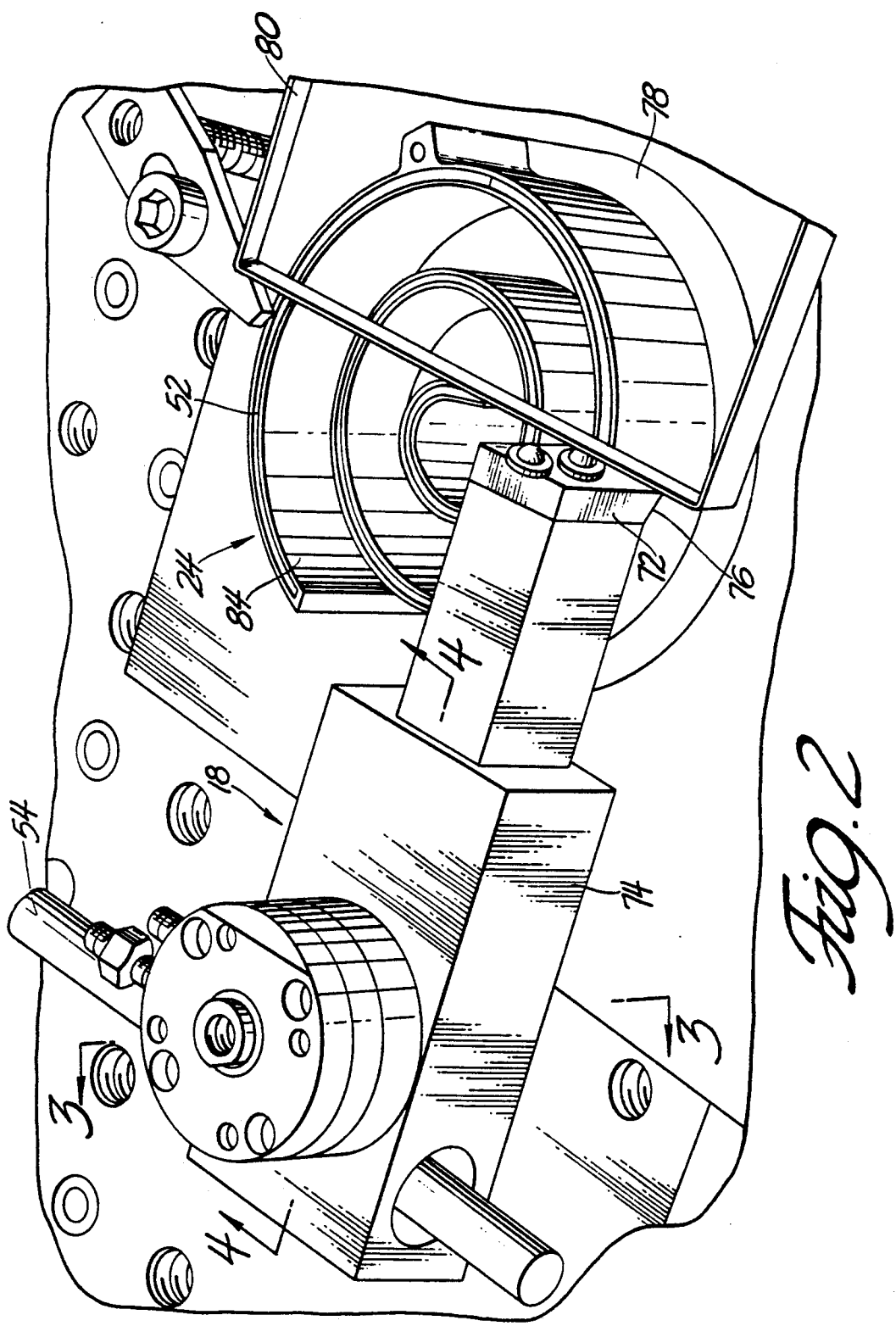
FIG. 2 is an enlarged perspective view of the tool tip, a tip seal material cutter and a scroll which is receiving tip seal strip material.
Figure 3:
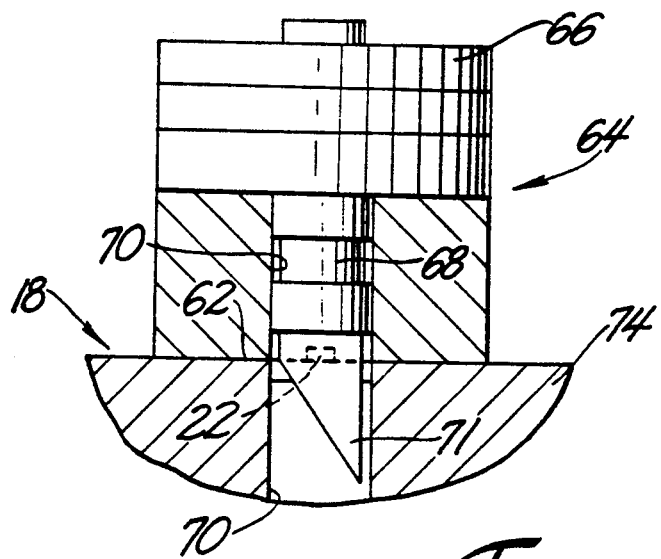
FIG. 3 is a sectional side elevation of the tool tip.
Figure 4:
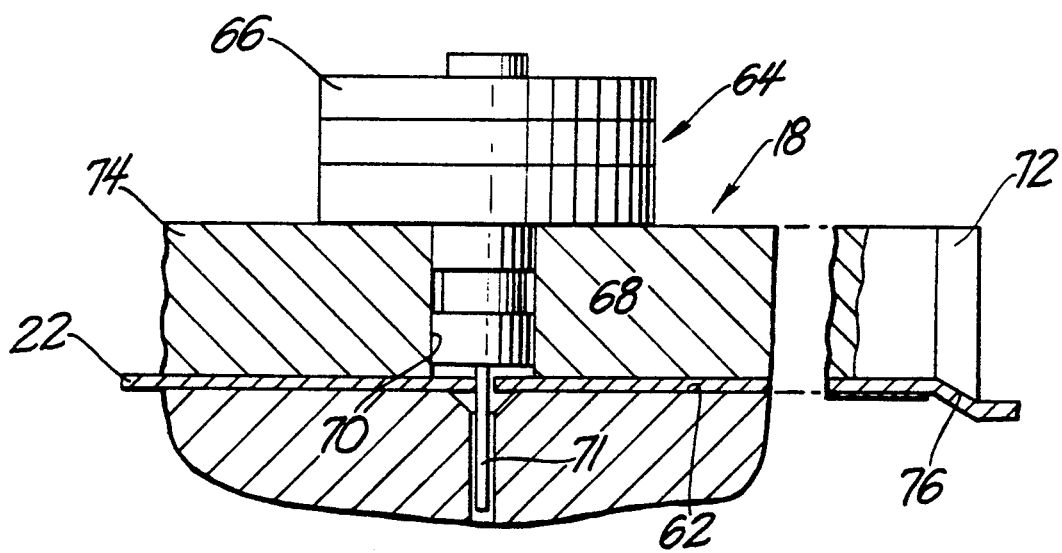
FIG. 4 is a sectional view taken along line 4—4 of FIG. 3 showing the cutter.

To improve reliability and decrease costs manufacturers are designing and manufacturing automatic assembly machines. These machines are expensive to manufacture. However, the machines or portions of machines they assemble can be less expensive and may be more reliable than machines assembled manually.

The scroll tip seal automatic assembly machine 10 includes a tip seal material reel 12 and reel support spindle 14. A tip seal material drive and metering mechanism 16, a tool tip assembly 18 and a scroll assembly fixture nest 20.

A tip seal reel 12 is supported on a reel support spindle 14. The tip seal reel 12 holds tip seal material 22 for a large number of scrolls 24. The reel support spindle 14 is free turning. However, it may be provided with a brake or friction device (not shown) if required to maintain some tension on the tip seal material 22 as it is unwound from the tip seal reel 12.

The tip seal material metering mechanism 16 includes a driven roller 26 and a spring biased roller 28. The tip seal material 22 passes between the driven roller 26 and the spring biased roller 20. A spring 30 biases the spring biased roller 28 toward the driven roller 26 and clamps the tip seal material 22 between the two rollers. The spring biased roller 28 is adjusted by screw member 32 to be parallel to the driven roller 26 with tip seal material 22 between the rollers 26 and 28. The screw member 34 is adjusted to load the spring 30. The spring 30 exerts sufficient force on the spring biased roller 28 to insure that the tip seal material 22 is pulled from the tip seal reel 12 and that there is no slippage between the driven roller 26 and the tip seal material 22.

The tip seal material 22 passes over a horizontal shaft 36 as it is unwound from the tip seal reel 12 by the driven roller 26. After passing over the horizontal shaft 36 the tip seal material 22 passes between a first pair of rollers 38 and 40 that are rotatable about vertical axes. The tip seal material 22 passes between a second pair of rollers 42 and 44 that are rotatable about horizontal axes following passage between the first pair of rollers 38 and 40. A third pair of rollers 46 and 48 rotatable about vertical axes receive the tip seal material 22 after it passes through the second pair of rollers 42 and 44. The first pair of rollers 38 and 40, the second pair of rollers 42 and 44 and the third pair of rollers 46 and 48 cooperate with each other to straighten the tip seal material 22 as it is unwound from the tip seal reel 12 and to guide the tip seal material 22 to the driven roller 26.

The tip seal material 22 enters a guide tube 50 as it leaves the driven roller 26 and the spring biased roller 28. The guide tube 50 is a plastic tube with a circular cross section having an internal diameter that is larger than the tip seal material 22. The tip seal material 22 has a generally rectangular cross section. Tip seal material 22 with other cross section shapes could be used if desired.

The tip seal material 22 is under tension between the tip seal reel 12 and the driven roller 26. The driven roller 26 pushes the tip seal material 22 into the guide tube 50 and all the way to a scroll tip seal groove 52. The guide tube 50 guides the tip seal material from the driven roller 26 to a tool tip assembly 18.

The tool tip assembly 18 is pivotally and slidably supported on a tool tip support shaft 54. The tool tip support shaft 54 is supported at each end by shaft support members 56. The shaft support members 56 are clamped to a frame 58.

The guide tube 50 is secured to the tool tip assembly 18 by a connector 60. Tip seal material 22 is delivered to a passage 62 in the tool tip assembly 18. The passage 62 has a cross section shape that is the same as the shape of the tip seal material 22. The passage 62 is slightly larger in dimensions than the tip seal material 22 so that the tip seal material can pass through the passage without unacceptable resistance.

A knife assembly 64 is provided to sever the tip seal material 22 when the tip seal drive and metering mechanism has advanced sufficient tip seal material for one tip seal. The knife assembly 64 includes an air cylinder 66 mounted on the tool tip assembly 18 with a reciprocable rod 68 positioned in a bore 70. A blade 71 attached to the reciprocable rod 68 moves across the passage 62. When the air cylinder 66 is activated and severs tip seal material 22 in the passage 62.

The passage 62 extends on from the bore 70 to a plastic member 72 attached to the block 74 of the tip tool assembly 18. The plastic member 72 is attached to the block 74 adjacent the exit end of the passage 62. A guide surface 76 on the bottom of the plastic member 72 guides tip seal material 22 into a scroll tip seal groove 52.

A scroll assembly fixture nest 20 is mounted on the frame 58. The scroll assembly fixture nest 20 includes a rotatable scroll support bearing 78. A transparent plate 80 is mounted directly above a scroll 24 on the scroll assembly fixture nest 20 and adjacent to the plastic member 72 on the end of the tool tip assembly 18.

The scroll tip seal automatic assembly machine 10 is ready to start operation when a scroll 24 is placed in the rotatable scroll assembly fixture nest 20, tip seal material 22 extends from the tip seal reel 12 to the end of the passage 62 in the tool tip assembly 18 and the free end of the tip seal material 22 is above one end of the scroll tip seal groove 52 in the scroll 24. Operation of the scroll tip assembly machine 10 starts with the driven roller 26 forcing tip seal material from the passage 62 in the tool tip assembly 18. The guide surface 76 on the plastic member 72 directs tip seal material 22 into an end of the scroll tip seal groove 52. Continued feeding of the tip seal material 22 rotates the scroll 24 in the rotatable scroll assembly fixture nest 20 and the guide surface 76 continues to guide the tip seal material into the scroll tip seal groove 52. The transparent plate 80 which is mounted directly above the scroll tips prevents the tip seal material from buckling and coming out of the scroll tip seal groove 52. The sides of the scroll tip seal groove 52 guides the tip seal material 22 to one side as the scroll 24 rotates. The lateral movement of the tip seal material 22 moves the entire tool tip assembly 18 on the tool tip support shaft 54. The plastic member 72 can be modified to contact the flanks of the wrap 84 on the scroll 24 in the event that relative thin weak tip seal material 22 is used that does not have sufficient strength to slide the tool tip assembly 18 on the tool tip support shaft 54.

When the tip seal element drive and metering mechanism 16 has metered out sufficient tip seal material 22 to fill a scroll tip seal groove 52 on one scroll 24, the driven roller 26 stops, air is directed to the air cylinder 66 and the blade 71 severs the tip seal material 22.

The driven roller 26 starts to advance the tip seal material 22 again after the blade 71 is retracted from the passage 62 following severing of the tip seal material. As the tip seal material 22 is advanced by the driven roller 26, the severed piece is pushed from the passage 62 and continues to be fed into the tip seal groove 52, to rotate the scroll 24 and to move the tool tip assembly 18 on the tool tip support shaft 54. When the severed piece of tip seal material 22 is completely out of the passage 62 and in the tip seal groove 52, the driven roller 26 stops advancing the tip seal material 22. The scroll 24, with tip seal material 22 in its scroll tip seal groove 52, is removed from the rotatable scroll support 78, another scroll 24 without a tip seal is mounted on the rotatable scroll support bearing 78, and the tool tip assembly is lined up with the scroll tip seal groove 52 so that the assembly cycle is ready to start again.

The passage 62 has a cross section which is substantially the same size and shape as a cross section of the tip seal material 22. This insures that a severed piece of tip seal material 22 can be pushed from the passage 62 and into a scroll tip seal groove 52 after being severed by the knife assembly 64.

The invention has been described in detail in connection with a preferred embodiment. The preferred embodiment is an example only and the invention is not restricted thereto. Those skilled in the art will understand that variations and modifications can be made within the scope of this invention.

I claim:

1. A method for inserting a tip seal, for a scroll type fluent material handling scroll, in an axial tip seal groove in a scroll wrap axial tip including:

a. placing a scroll for a scroll type fluent material handling machine in a rotatable scroll assembly fixture nest,
b. unwinding and feeding tip seal material from a reel,
c. straightening the tip seal material and feeding the seal material to a tool tip,
d. directing tip seal material into the scroll tip seal groove,
e. continuing to feed tip seal material to rotate the scroll and to align the tip seal material with the axial tip seal groove,
f. metering the tip seal material,
g. cutting the tip seal material to length,
h. pushing the remainder of the severed tip seal material into the axial tip seal groove, and
i. removing the scroll from the assembly fixture nest.

2. A method for inserting a top seal for a scroll type fluent material handling scroll, in an axial tip seal groove in a scroll wrap axial tip including:
a. inserting a scroll for a scroll type fluent material handling machine in a rotatable scroll assembly fixture nest,
b. unwinding and feeding tip seal material from a reel,
c. straightening the tip seal material and feeding the seal material to a tool tip,
d. directing tip seal material into the scroll tip seal groove,
e. continuing to feed tip seal material to rotate the scroll and to align the tip seal material with the axial tip seal groove,
f. metering the tip seal material,
g. cutting the tip seal material to length,
h. pushing the remainder of the severed tip seal material into the axial tip seal groove, and
i. removing the scroll from the assembly fixture nest.

* * * * *